United States Patent
Kim et al.

(10) Patent No.: US 11,619,966 B2
(45) Date of Patent: Apr. 4, 2023

(54) DISPLAY APPARATUS AND SOUND OUTPUTTING METHOD THEREOF

(71) Applicant: SAMSUNG ELECTRONICS CO., LTD., Suwon-si (KR)

(72) Inventors: Sungjoo Kim, Suwon-si (KR); Jongbae Kim, Suwon-si (KR); Sungha Son, Suwon-si (KR); Wooyoung Cheon, Suwon-si (KR); Sangchul Ko, Suwon-si (KR); Dongkyu Park, Suwon-si (KR); Mingyu Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/091,753

(22) Filed: Nov. 6, 2020

(65) Prior Publication Data

US 2021/0200264 A1 Jul. 1, 2021

(30) Foreign Application Priority Data

Dec. 31, 2019 (KR) .................. 10-2019-0179840

(51) Int. Cl.
*G06F 1/16* (2006.01)
*G06F 3/16* (2006.01)
*H04R 3/12* (2006.01)
*H04S 1/00* (2006.01)

(52) U.S. Cl.
CPC ............. *G06F 1/1605* (2013.01); *G06F 3/16* (2013.01); *H04R 3/12* (2013.01); *H04S 1/007* (2013.01); *H04R 2499/15* (2013.01)

(58) Field of Classification Search
CPC ....... H04R 3/12; H04R 2499/15; G06F 1/605; G06F 1/601; G06F 3/16
See application file for complete search history.

(56) References Cited

U.S. PATENT DOCUMENTS

| | | | |
|---|---|---|---|
| 9,749,724 B2 | 8/2017 | Park | |
| 10,327,066 B2 | 6/2019 | Jung et al. | |
| 11,006,210 B2 | 5/2021 | Ko et al. | |
| 11,579,833 B2 | 2/2023 | Maeshiba et al. | |
| 2006/0222182 A1* | 10/2006 | Nakaishi | H04S 7/302 381/27 |
| 2007/0036366 A1* | 2/2007 | Konagai | H04R 3/12 381/61 |

(Continued)

FOREIGN PATENT DOCUMENTS

| | | |
|---|---|---|
| JP | 2008-153716 A | 7/2008 |
| JP | 2015-41816 A | 3/2015 |

(Continued)

OTHER PUBLICATIONS

Wikipedia, "Electronic filter". (Year: 2021).*

(Continued)

*Primary Examiner* — Ping Lee
(74) *Attorney, Agent, or Firm* — Sughrue Mion, PLLC

(57) ABSTRACT

A display apparatus including a display panel configured to display an image in a front direction; a main speaker provided on a rear surface of the display panel; and an auxiliary speaker provided on the rear surface of the display panel, the auxiliary speaker being configured to output a sound in a rear direction opposing the front direction.

15 Claims, 12 Drawing Sheets

(56) References Cited

U.S. PATENT DOCUMENTS

| | | | |
|---|---|---|---|
| 2008/0292121 A1* | 11/2008 | Yokota | H04R 5/04 381/301 |
| 2009/0196440 A1* | 8/2009 | Suzuki | H04R 5/04 381/160 |
| 2012/0281868 A1 | 11/2012 | Yamanaka | |
| 2013/0279730 A1* | 10/2013 | Tanaka | H04N 5/642 381/333 |
| 2015/0055027 A1 | 2/2015 | Suzuki et al. | |
| 2015/0104051 A1 | 4/2015 | Chien | |
| 2015/0326815 A1 | 11/2015 | Masuda et al. | |
| 2015/0326816 A1* | 11/2015 | Hamadate | H04R 1/345 348/843 |
| 2016/0014367 A1 | 1/2016 | Yeo et al. | |
| 2017/0150244 A1 | 5/2017 | Park | |
| 2018/0167724 A1 | 6/2018 | Jung et al. | |
| 2019/0069089 A1 | 2/2019 | Jung et al. | |
| 2019/0166419 A1 | 5/2019 | Ko et al. | |
| 2021/0089257 A1 | 3/2021 | Maeshiba et al. | |
| 2021/0200283 A1 | 7/2021 | Park et al. | |

FOREIGN PATENT DOCUMENTS

| | | |
|---|---|---|
| KR | 10-2017-0060285 A | 6/2017 |
| KR | 10-1793691 B1 | 11/2017 |
| KR | 10-2018-0066923 A | 6/2018 |
| KR | 10-2019-0062902 A | 6/2019 |
| KR | 1020210085866 A | 7/2021 |
| WO | 2019130972 A1 | 7/2019 |

OTHER PUBLICATIONS

Communication dated Mar. 1, 2021, issued by the European Patent Office in European Application No. 20209636.8.

International Search Report and Written Opinion dated Mar. 18, 2021, issued by the International Searching Authority in International Application No. PCT/KR2020/016167 (PCT/ISA/210 and 237).

Communication dated Nov. 30, 2022 issued by the European Patent Office in European Application No. 20209636.8.

* cited by examiner

DISPLAY APPARATUS AND SOUND OUTPUTTING METHOD THEREOF

CROSS-REFERENCE TO RELATED APPLICATION(S)

This application is based on and claims priority under 35 U.S.C. § 119 to Korean patent application number 10-2019-0179840, filed on Dec. 31, 2019 in the Korean Intellectual Property Office, the disclosure of which is incorporated by reference herein in its entirety.

BACKGROUND

1. Field

The disclosure relates to a display apparatus and a sound outputting method of the display apparatus, and more particularly, to a display apparatus for outputting of a high-realism sound and a sound outputting method of the display apparatus.

2. Description of Related Art

Spurred by the development of electronic technologies, various types of electronic apparatuses are being developed and distributed. In particular, display apparatuses used in various places such as homes, offices, and public spaces are being continuously developed.

Recently, sound generating apparatuses for reproducing a high-realism sound are being applied in display apparatuses such as a television, a monitor, etc. For example, a speaker is being provided on a lower end of a television behind a display panel for a thin bezel design.

However, in a large-size screen, a location of a person speaking on the screen and a location wherein a sound is actually generated do not coincide due to a speaker provided on the lower end.

SUMMARY

Provided is a display apparatus including a main speaker and an auxiliary speaker outputting a sound to the rear side of the display apparatus, and a sound outputting method of the display apparatus.

According to an aspect of the disclosure, a display apparatus may include a display panel configured to display an image in a front direction; a main speaker provided on a rear surface of the display panel; and an auxiliary speaker provided on the rear surface of the display panel, the auxiliary speaker being configured to output a sound in a rear direction opposing the front direction.

The auxiliary speaker may be configured to output the sound in a direction that is inclined by a predetermined angle with respect to the rear surface of the display panel.

The auxiliary speaker may include an upper speaker provided on an upper portion of the rear surface of the display panel; and a side speaker provided on a side portion of the rear surface of the display panel.

The auxiliary speaker may be provided on a corner of an upper portion of the rear surface of the display panel.

The display apparatus may further include backside cover covering the auxiliary speaker.

The backside cover may include an air vent or slit in an area corresponding to a sound outputting area of the auxiliary speaker.

The main speaker may include a first main speaker provided on a side portion of the rear surface of the display panel, the first main speaker being configured to output a sound in a side direction; and a second main speaker provided on a lower portion of the rear surface of the display panel, the second main speaker being configured to output a sound in a lower direction.

The first main speaker may include at least one of a tweeter or a mid-range speaker, and the second main speaker may include a woofer.

The display apparatus may further include a processor configured to determine a type of an input audio signal, and control the auxiliary speaker to output a portion of the input audio signal, the portion being determined based on the determined type of the input audio signal.

The processor may be configured to, based on a two-channel audio signal being input, control the main speaker to output the input two-channel audio signal, and control the auxiliary speaker to output a processed audio signal, the processed audio signal comprising the input two-channel audio signal after signal processing has been performed.

The signal processing performed on the input two-channel audio signal may include bandwidth reinforcing processing within a predetermined frequency range.

The processor may be further configured to control the auxiliary speaker to output a portion of the input audio signal excluding a front channel that is provided to the main speaker.

According to another aspect of the disclosure, a sound outputting method of a display apparatus may include receiving an input of an audio signal; determining a type of the input audio signal; outputting, by a main speaker, the input audio signal; and outputting, by an auxiliary speaker, a portion of the input audio signal based on the determined type of the input audio signal.

The outputting through the main speaker may include, based on a two-channel audio signal being input, outputting the two-channel audio signal through the main speaker, and the outputting through the auxiliary speaker may include outputting a processed audio signal through the auxiliary speaker, the processed audio signal comprising the two-channel audio signal on which signal processing has been performed.

The signal processing performed on the two-channel audio signal may include bandwidth reinforcing processing within a predetermined frequency range.

The outputting through the auxiliary speaker may include outputting a portion of the input audio signal excluding a front channel that is provided to the main speaker.

According to yet another aspect of the disclosure, a sound outputting method of a display apparatus may include receiving an input of an audio signal; determining a type of the input audio signal; outputting a first portion of the input audio signal through a main speaker; and outputting a second portion of the input audio signal through an auxiliary speaker. The first portion of the audio signal and the second portion of the audio signal may be determined based on the determined type of the input audio signal.

The method may further include setting, based on the type of the input audio signal being a signal have two or less channels, a front channel of the input audio signal as the first portion of the input audio signal; compiling, based on the type of the input audio signal being a signal have three or more channels, the front channel and a low pass filtered version of a surround channel as the first portion of the input audio signal; and compiling, based on the type of the input audio signal being a signal have three or more channels, a high pass filtered version of the surround channel and a band pass filtered version of the front channel as the second portion of the input audio signal.

BRIEF DESCRIPTION OF THE DRAWINGS

The above and other aspects, features, and advantages of certain embodiments the present disclosure will become more apparent from the following description taken in conjunction with the accompanying drawings, in which.

DETAILED DESCRIPTION

Figure 1:
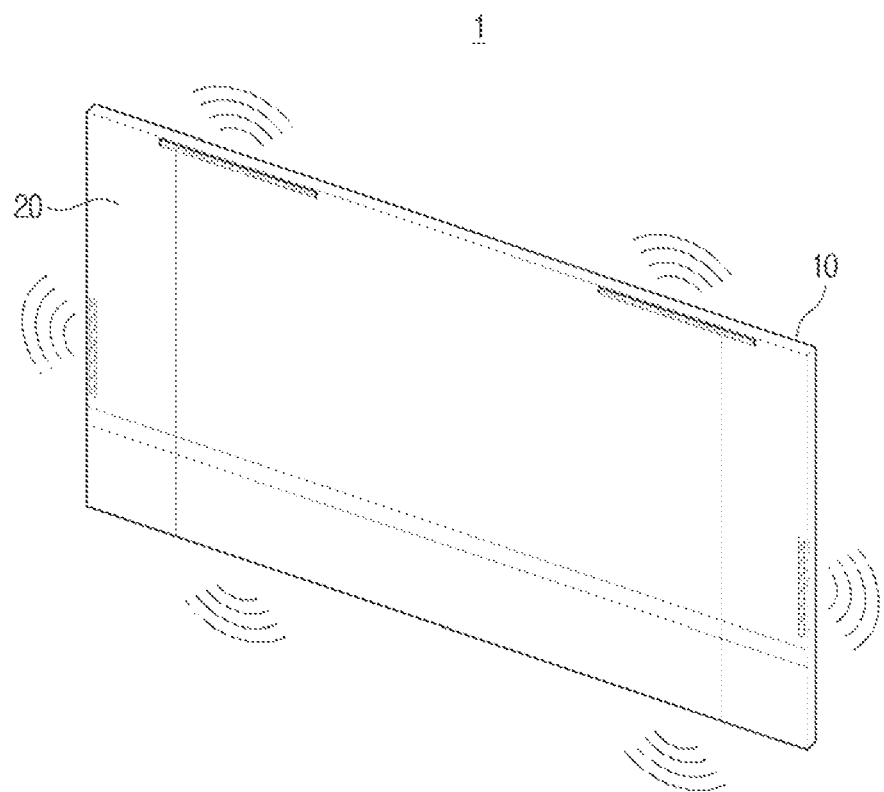
FIG. 1 is a perspective view schematically illustrating a rear surface of a display apparatus according to an embodiment.

The embodiments described below are provided to aid understanding of the disclosure, and it should be noted that the disclosure may be implemented in various forms that differ from the embodiments described herein. In explaining the disclosure below, in case it is determined that detailed explanation of related known functions or components may unnecessarily confuse the gist of the disclosure, the detailed explanation and detailed illustration will be omitted. Also, in the accompanying drawings, some components may not be illustrated according to their actual sizes but they may be illustrated in exaggerated sizes, for promoting understanding of the disclosure.

As terms used in this specification and the claims, general terms were selected, in consideration of the functions in the disclosure. However, the terms may vary depending on the intention of those skilled in the art, legal or technical interpretation and emergence of new technologies, etc. Also, there are some terms that were arbitrarily designated by the Applicant, and the meaning of such terms may be interpreted as defined in this specification. Meanwhile, terms that are not specifically defined in the disclosure may be interpreted based on the overall content of this specification and common technical knowledge in the pertinent art.

In the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps.

In this specification, terms such as "have," "may have," "include," and "may include" should be construed as denoting that there are such characteristics (e.g.: elements such as numerical values, functions, operations, and components), and the terms are not intended to exclude the existence of additional characteristics.

Terms such as "first," "second" and the like may be used to describe various elements, but they are not intended to limit the elements. Such expressions are used only to distinguish one element from another element. For example, a first element may be called a second element, and a second element may be called a first element in a similar manner, without departing from the scope of the disclosure.

Also, the terms such as 'front surface,' 'rear surface,' 'top surface,' 'bottom surface,' 'side surface,' 'left side,' 'right side,' 'upper part,' 'lower part,' etc. used in the disclosure were defined based on the drawings, and the shapes and locations of each element are not limited by these terms.

In addition, in this specification, elements necessary for explanation of each embodiment of the disclosure are described, and thus elements are not necessarily limited thereto. Accordingly, some elements may be changed or omitted, or other elements may be added. Also, elements may be arranged to be dispersed in apparatuses independent from one another.

Further, while the embodiments of the disclosure will be described in detail with reference to the accompanying drawings and the contents described in the accompanying drawings below, the disclosure is not restricted or limited by the embodiments.

FIG. 1 is a perspective view schematically illustrating the rear surface of a display apparatus 1 according to an embodiment.

The display apparatus 1 is an apparatus for visually displaying data on a screen.

Referring to FIG. 1, the display apparatus 1 may include a display panel 10 displaying an image and a backside cover 20 covering a backside of the display apparatus 1.

The display panel 10 is configured to display an image, and is installed to be exposed to a front surface of the display apparatus 1. As the display panel 10, various types of display panels such as a liquid crystal display (LCD) panel, an organic light emitting diodes (OLED) panel, a quantum dot light emitting diodes (QLED) panel, a micro LED panel, etc. may be used. Since a display panel incorporating a conventional technology may be used as the display panel 10, detailed explanation will be omitted.

A sound outputting apparatus 100 outputting a sound may be provided between the display panel 10 and the backside cover 20.

For example, the sound outputting apparatus 100 may be implemented as at least one speaker. Here, the speaker may perform the function of converting an electric pulse into a sound wave, and it may be implemented as a dynamic type that is distinguished according to the principle and method of converting an electric signal into a sound wave. However, the disclosure is not limited thereto, and the speaker may be implemented as an electrostatic type, a dielectric type, a magnetostrictive type, etc. within a range wherein the disclosure is applied.

In a case where the sound outputting apparatus 100 includes a plurality of speakers, the sound outputting apparatus 100 may utilize a plurality of channel configurations such as a 2 channel, a 2.1 channel, a 3 channel, a 3.1 channel, a 5.1 channel, a 7.1 channel, etc. and reproduce the channels. For example, the plurality of speakers may include a center (C) speaker, a left (L) speaker, and a right (R) speaker.

Figure 2:
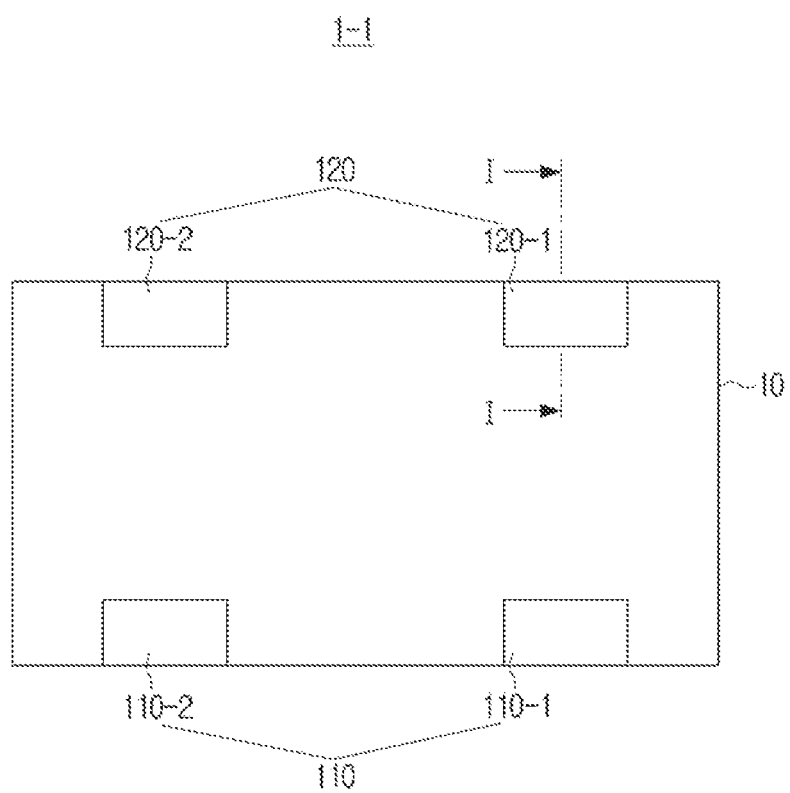
FIG. 2 is a rear view schematically illustrating a state in which a backside cover has been separated from a display apparatus according to an embodiment.
Figure 3:
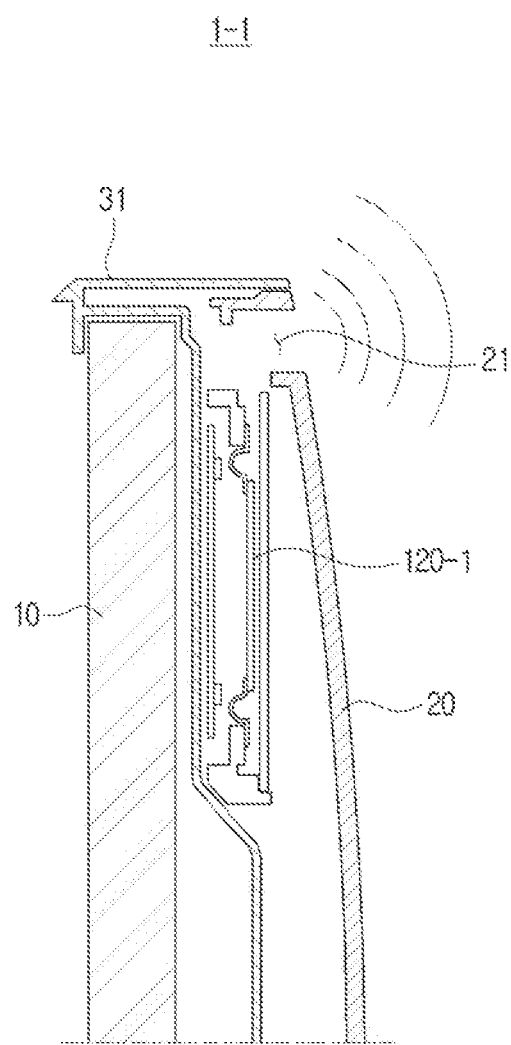
FIG. 3 is a cross-sectional view showing an enlarged cross-section of an auxiliary speaker along the line I-I indicated in FIG. 2.

FIG. 2 is a rear view schematically illustrating a display apparatus 1-1 in which the backside cover 20 has been removed according to an embodiment, and FIG. 3 is a cross-sectional view of the display apparatus 1-1 which enlarged the cross-section of the auxiliary speaker 120 along the line I-I indicated in FIG. 2.

Referring to FIG. 2, the display apparatus 1-1 may include a main speaker 110 and an auxiliary speaker 120 provided on the rear surface of the display panel 10.

The main speaker 110 may be provided in the lower portion of the rear surface of the display panel 10. The main speaker 110 may output a sound in at least one direction among the front direction in which the display panel 10 displays an image, the rear direction opposing the front direction, or the lower direction.

The main speaker 110 may include a left side main speaker 110-1 and a right side main speaker 110-2. The left side and the right side may be set for viewing the display panel 10 of the display apparatus 1-1 from the front surface.

In a case where a two-channel sound source is input into the display apparatus 1-1, the left side main speaker 110-1 and the right side main speaker 110-2 may output respective channels. For example, the left side main speaker 110-1 and the right side main speaker 110-2 may respectively output a L channel and an R channel.

Referring to FIG. 2, the auxiliary speaker 120 may be provided in the upper portion of the rear surface of the display panel 10. Detailed explanation regarding the direction in which the left side auxiliary speaker 120-1 outputs a sound will be described later in FIG. 3. The right side auxiliary speaker 120-2 and auxiliary speakers of other embodiments may be configured similarly.

The auxiliary speaker 120 may include a left side auxiliary 120-1 and a right side auxiliary speaker 120-2. In this case, the sounds output from the left side auxiliary speaker 120-1 and the right side auxiliary speaker 120-2 may be sounds for which signal processing has been performed for a two-channel sound source respectively input into the left side auxiliary speaker 120-1 and the right side auxiliary speaker 120-2. Detailed explanation regarding signal processing for a two-channel sound source will be described later in FIG. 11A.

Referring to FIG. 3, the backside cover 20 may have an air vent 21 in an area corresponding to the sound outputting area of the left side auxiliary speaker 120-1.

The left side auxiliary speaker 120-1 may output a sound in the rear direction of the display apparatus 1-1 through the air vent 21 of the backside cover 20. However, the sound outputting direction of the auxiliary speaker 120 is not limited to the rear direction. For example, a slit may exist on the topside cover 31 of the display apparatus 1-1, and the left side auxiliary speaker 120-1 may output a sound in the upper direction from the display apparatus 1-1 through the slit of the topside cover 31.

In an embodiment, the auxiliary speaker 120 may output a sound in a direction that is inclined by a predetermined angle with respect to the rear surface of the display panel 10. For example, the auxiliary speaker 120 may output a sound in a direction that is inclined from the rear direction of the display panel 10 to the upper direction.

Accordingly, in a case where the display apparatus 1-1 is used in an actual-use environment such as in a home, a sound output from the auxiliary speaker 120 is reflected on a wall and a ceiling behind the display apparatus 1-1 and transmitted to a user in front of the display apparatus 1-1. Thus, a user may feel the sense of height as if a sound is generated in a location higher than the height of the display apparatus 1-1.

A sound image may be located at the center of the display panel 10, or a location wherein a sound image is generated may be set by an output of a plurality of speakers provided in the upper portion and the lower portion of the display apparatus 1-1. A sound image is a location where a sound is perceived by a user as being generated, but not the actual location of a speaker where a sound is generated. Accordingly, the problem of discrepancy between an image on a screen and an associated a sound image that a user perceives may be resolved.

In some cases, a ratio of an indirect sound to a direct sound transmitted from the auxiliary speaker 120 to a user may be increased. A direct sound is a sound generated from a speaker and directly transmitted to a listener, and an indirect sound is a sound that is reflected on a wall, a ceiling, a bottom, and other structures and transmitted to a listener. Accordingly, a sense of space that a user perceives may be extended.

Figure 4:
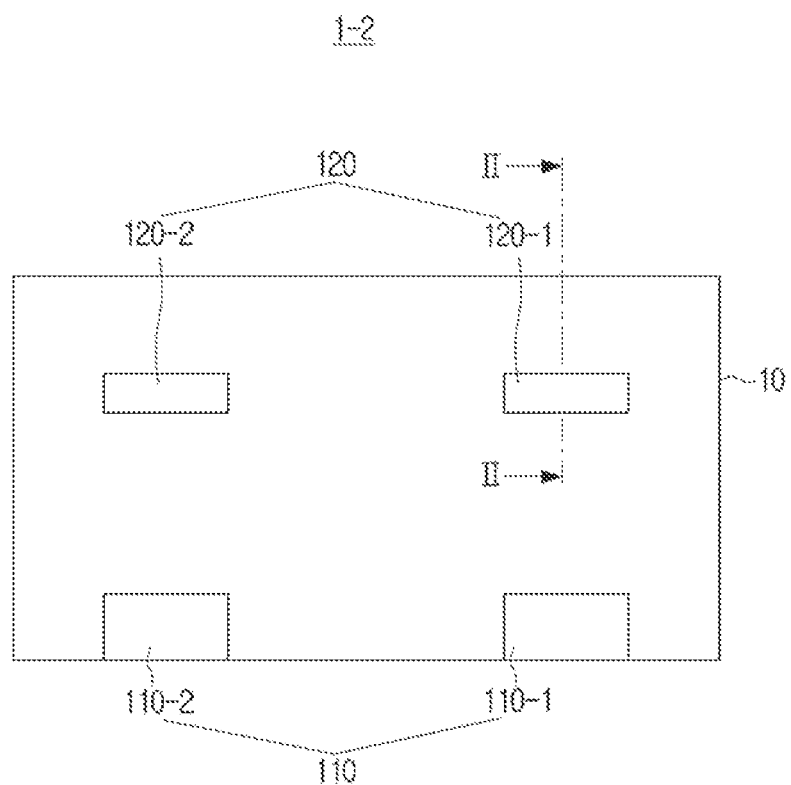
FIG. 4 is a rear view schematically illustrating a state in which a backside cover has been separated from a display apparatus according to another embodiment.
Figure 5:
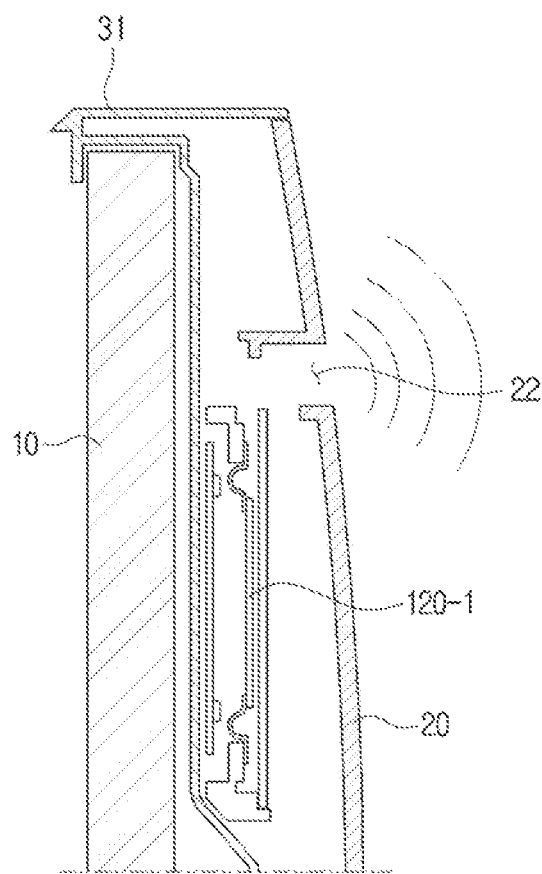
FIG. 5 is a cross-sectional view showing an enlarged cross-section of an auxiliary speaker along the line II-II indicated in FIG. 4.

FIG. 4 is a rear view schematically illustrating a display apparatus 1-2 in which a backside cover has been removed according to another embodiment, and FIG. 5 is a cross-sectional view showing an enlarged cross-section of an auxiliary speaker along the line II-II indicated in FIG. 4.

Referring to FIG. 4, the display apparatus 1-2 may include a main speaker 110 and an auxiliary speaker 120 provided on the rear surface of the display panel 10.

As explanation regarding arrangement of the main speaker 110 overlaps with FIG. 2, the explanation will be omitted.

The auxiliary speaker 120 may be provided in a location that is distanced from the upper end of the rear surface of the display panel 10 by a predetermined distance.

Referring to FIG. 5, the backside cover 20 may have a slit 22 in an area corresponding to the sound outputting area of the auxiliary speaker 120.

The auxiliary speaker 120 may output a sound in the rear direction of the display apparatus 1-2 through the slit 22 of the backside cover 20.

In this case, the auxiliary speaker 120 may output a sound in a direction that is inclined by a predetermined angle with respect to the rear surface of the display panel 10. For example, the auxiliary speaker 120 may output a sound in a direction that is inclined from the rear direction of the display panel 10 to the upper direction.

As explanation regarding the arrangement and the sound outputting direction of the auxiliary speaker 120 overlaps with FIG. 3, the explanation will be omitted.

Figure 6:
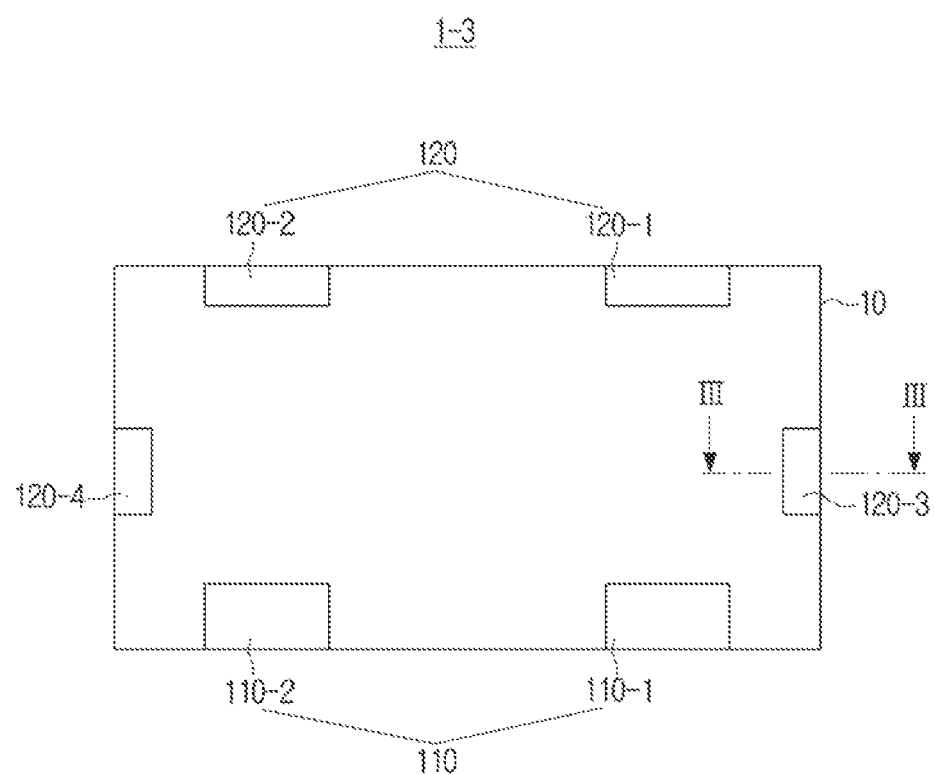
FIG. 6 is a rear view schematically illustrating a state in which a backside cover has been separated from a display apparatus according to another embodiment.
Figure 7:
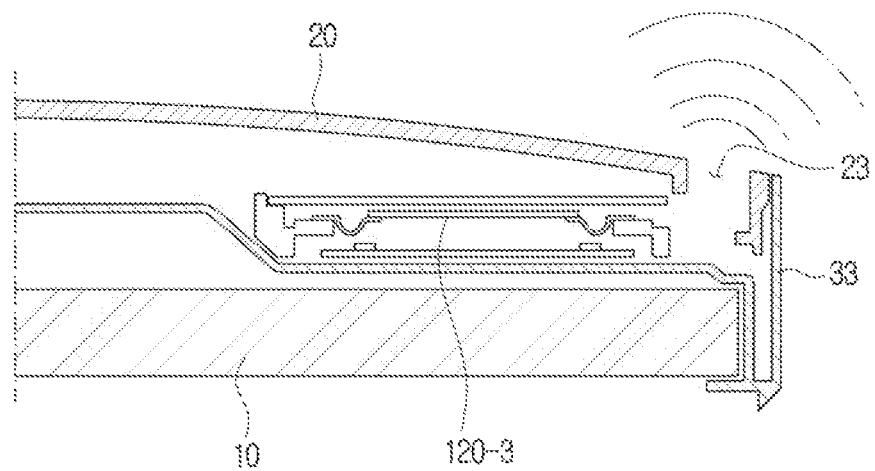
FIG. 7 is a cross-sectional view showing an enlarged cross-section of an auxiliary speaker along the line III-III indicated in FIG. 6.

FIG. 6 is a rear view schematically illustrating a display apparatus 1-3 in which a backside cover has been removed according to another embodiment, and FIG. 7 is a cross-sectional view showing an enlarged cross-section of the left side speaker 120-3 of the auxiliary speaker 120 along the line III-III indicated in FIG. 6. The right side speaker 120-4 and side speakers of other embodiments may be configured similarly.

Referring to FIG. 6, the auxiliary speaker 120 may include upper speakers 120-1 and 120-2 and side speakers 120-3 and 120-4.

The upper speakers 120-1 and 120-2 may be provided on the upper portion of the rear surface of the display panel 10, and include a left side upper speaker 121-1 and a right side upper speaker 121-2. As the arrangement and sound outputting of the upper speakers 120-1 and 120-2 overlap with those of the auxiliary speaker 120 in FIG. 2 through FIG. 5, explanation in this regard will be omitted.

The side speakers 120-3 and 120-4 may be provided on the side portion of the rear surface of the display panel 10. The side speakers 120-3 and 120-4 may include a left side speaker 120-3 and a right side speaker 120-4 provided on opposing sides of the rear surface of the display panel 10.

Referring to FIG. 7, in an area corresponding to the sound outputting area of the left side speaker 120-3 between the backside cover 20 and the side cover 33, a slit 23 may be formed.

The left side speaker 120-3 may output a sound in the side direction of the display apparatus 1-3 through the slit 23 between the backside cover 20 and the side cover 33.

Accordingly, a sound image may be located at the center of the display panel 10, or a location wherein a sound image is generated may be set by an output of a plurality of speakers provided in the upper portion and the lower portion of the display apparatus 1-3. Thus, the problem of discrepancy between an image a screen and an associated a sound image that a user perceives may be resolved.

Also, a sense of space that a user perceives may be extended by sounds output in various directions and reflected off object in the surrounding environment.

Figure 8:
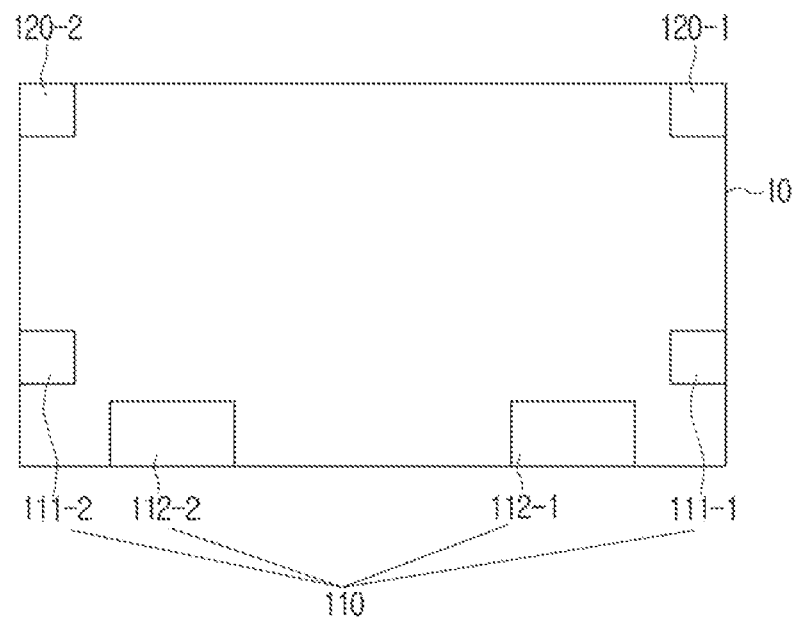
FIG. 8 is a rear view schematically illustrating a state in which a backside cover has been separated from a display apparatus according to another embodiment.

FIG. 8 is a rear view schematically illustrating a display apparatus 1-4 in which a backside cover has been separated according to another embodiment.

Referring to FIG. 8, the main speaker 110 may include first main speakers 111-1 and 111-2 and second main speakers 112-1 and 112-2.

The first main speakers 111-1 and 111-2 may be respectively provided on both sides of the rear surface of the display panel 10 and may output sound in the side directions.

The second main speakers 112-1 and 112-2 may be provided on the lower portion of the rear surface of the display panel 10 and may output sound in the lower direction.

In this case, the first main speakers 111-1 and 111-2 may include at least one of a tweeter or a mid-range speaker, and the second main speakers 112-1 and 112-2 may be woofers.

The auxiliary speaker 120 may be provided on the corner of the upper portion of the rear surface of the display panel 10.

Figure 9:
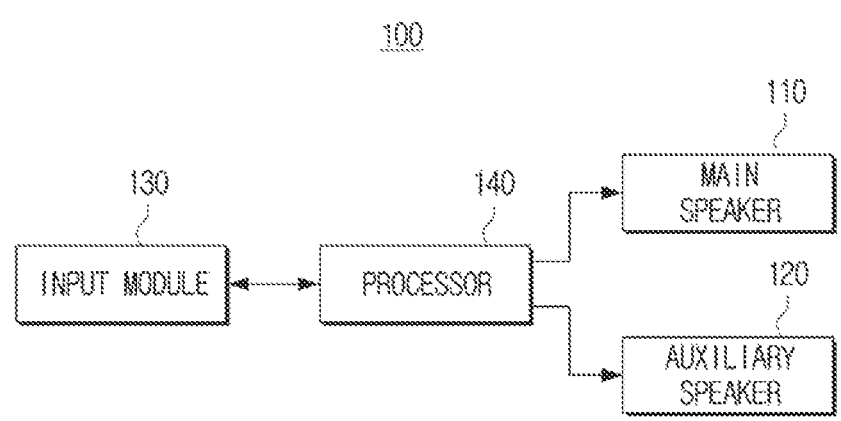
FIG. 9 is a block diagram showing a configuration of a sound outputting apparatus according to an embodiment.

FIG. 9 is a block diagram showing a configuration of the sound outputting apparatus 100 according to an embodiment.

Referring to FIG. 9, the sound outputting apparatus 100 may include an input module 130, a processor 140, a main speaker 110, and an auxiliary speaker 120.

The input module 130 may receive an input of a sound signal. For example, the input module 130 may receive an input of a sound signal by a streaming or download method from an external apparatus (e.g., a source apparatus), an external storage medium (e.g., a USB), an external server (e.g., a webhard), etc. through communication methods such as AP-based Wi-Fi (Wi-Fi, a wireless local area network (LAN)), Bluetooth, Zigbee, a wired/wireless LAN, a WAN, an Ethernet, the IEEE 1394, an HDMI, a USB, an MHL, the AES/EBU, Optical, Coaxial, etc.

The processor 140 may control the overall operations of the sound outputting apparatus 100.

According to an embodiment, the processor 140 may be implemented as a digital signal processor (DSP) processing digital sound signals, and a microprocessor. However, the disclosure is not limited thereto, and the processor 140 may include one or more of a central processing unit (CPU), a micro controller unit (MCU), a micro processing unit (MPU), a controller, an application processor (AP) or a communication processor (CP), and an ARM processor, or may be defined by the terms. Also, the processor 140 may be implemented as a system on chip (SoC) having a processing algorithm stored therein or large scale integration (LSI), or in the form of a field programmable gate array (FPGA).

Figure 10:
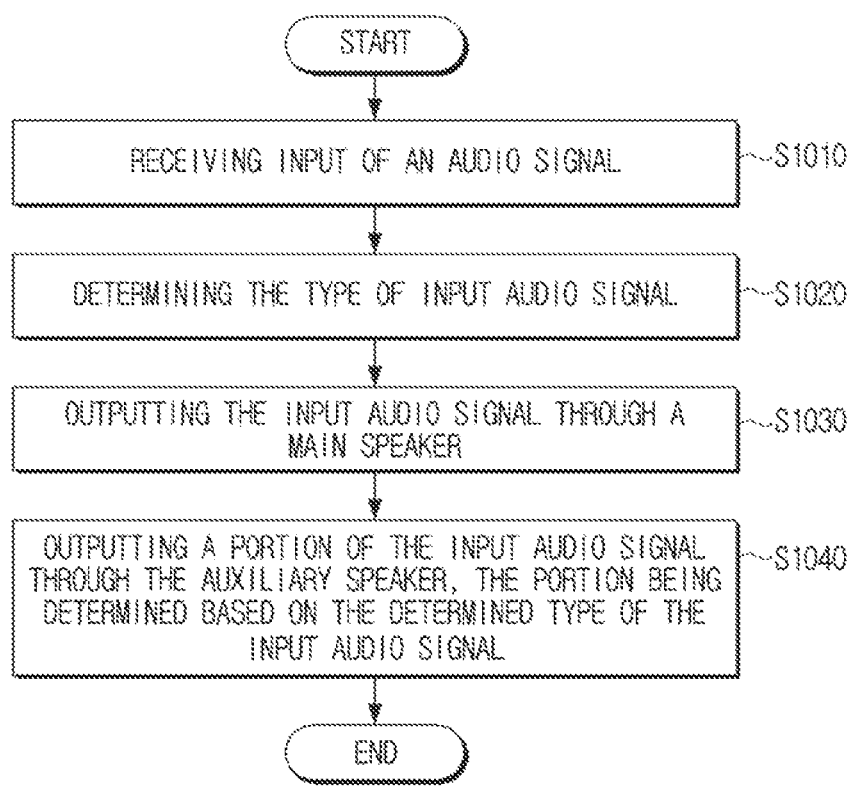
FIG. 10 is a flow chart showing a sound outputting method of a display apparatus according to an embodiment.

FIG. 10 is a flow chart showing a sound outputting method of a display apparatus according to an embodiment.

According to the sound outputting method of the display apparatus shown in FIG. 10, the input module 130 of the sound outputting apparatus 100 may receive an input of an audio signal at operation S1010.

Then, the processor 140 may determine the type of the input audio signal at operation S1020. In this case, the processor 140 may determine whether the input audio signal is an audio signal of two or fewer channels, or a multi-channel audio signal of three or more channels.

Then, the processor 140 may control the main speaker 110 to output the input audio signal at operation S1030.

At operation S1030, if a two-channel audio signal is input, the input two-channel audio signal may be output through the main speaker 110.

Then, at operation S1040, the processor 140 may control the auxiliary speaker 120 to output source portion of the input audio signal. The portion being determined based on the determined type of the input audio signal.

At operation S1040, a processed audio signal, that is a version of the input audio signal on which signal processing has been performed, may be output through the auxiliary speaker 120. In this case, signal processing of the input audio signal may be bandwidth reinforcing processing within a predetermined frequency range of the input audio signal.

Alternatively operation S1040, a surround channel, excluding a front channel of the audio signal provided to the main speaker 110, may be output by the auxiliary speaker 120. In the surround channel, signals such as a surround, a surround back, a center, a front top, a rear top, etc. may be included.

The auxiliary speaker 120 may output a surround channel, and thereby maximize a sense of space of a sound.

Figure 11A:
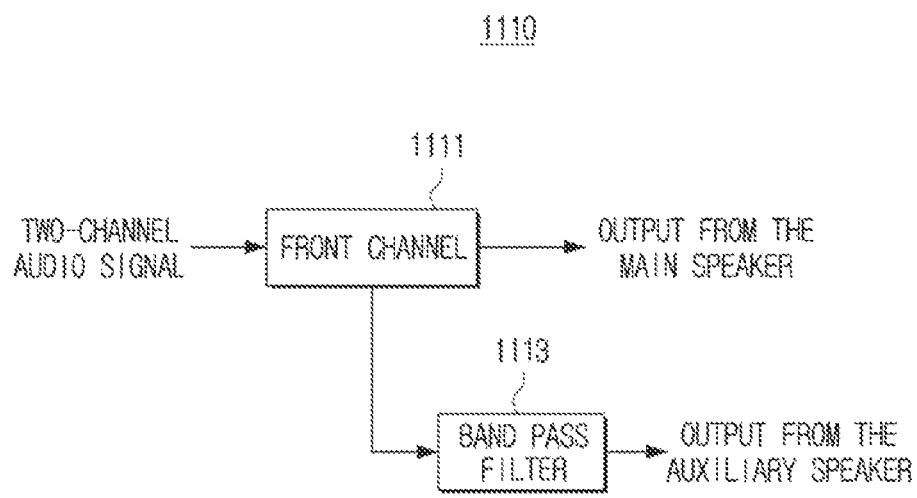
FIG. 11A is a diagram showing a signal processing method of a sound outputting apparatus according to an embodiment.
Figure 11B:
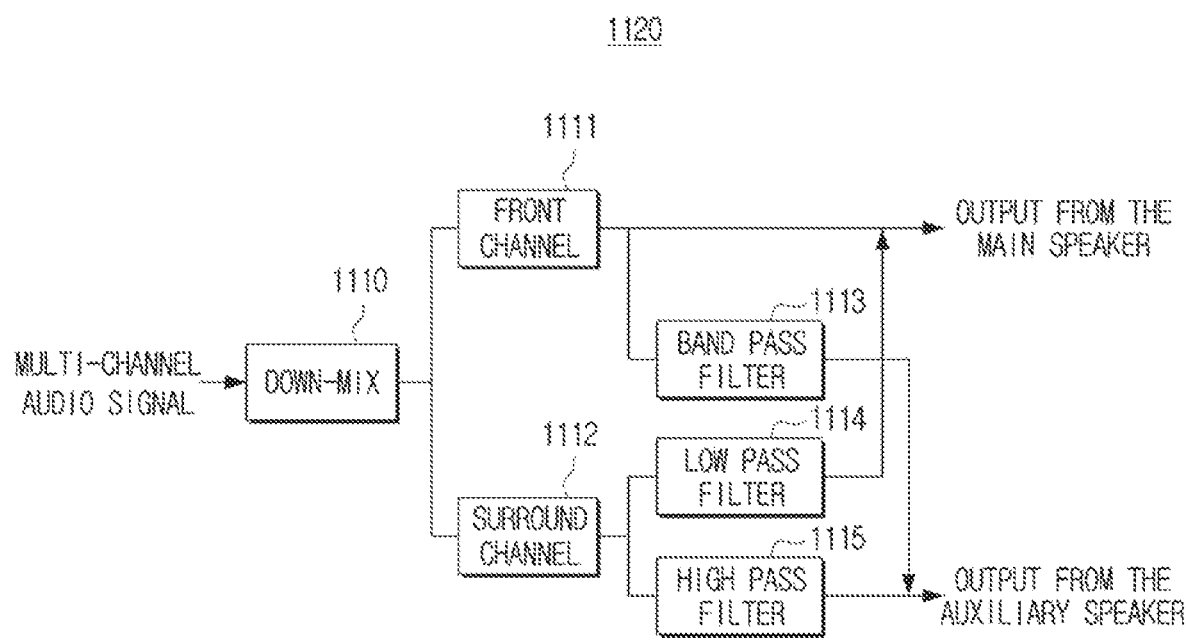
FIG. 11B is a diagram showing a signal processing method of a sound outputting apparatus according to an embodiment.

FIG. 11A and FIG. 11B are diagrams showing a signal processing method of the sound outputting apparatus 100 according to an embodiment.

Referring to FIG. 11A, according to an embodiment, if a two-channel audio signal is input, the processor 140 may control the main speaker 110 to output a signal corresponding to a front channel 1111 of the input audio signal. The front channel may include left and right audio channels. The processor 140 may also copy the front channel 1111 signal, and then control the auxiliary speaker 120 to output a filtered version of the front channel 1111 signal that has been filtered by a band pass filter (BPF). Accordingly, the frequency band reproduced at the mid-range speaker of the main speaker 110 may be reinforced by the auxiliary speaker 120.

Referring to FIG. 11B, according to another embodiment, if a multi-channel audio signal having 3 or more channels is input, the processor 140 may control the main speaker 110 to output a signal corresponding to the front channel 1111, and control the auxiliary speaker 120 to output a signal corresponding to the surround channel 1112, which is a signal that may include channels other than the front channel 1111. For example, the auxiliary speaker 120 may output a filtered version of the surround channel that has been filtered by a high pass filter 1115.

The number of output channels may be the same as the number of input channels, or it may be a number which has been extended or reduced from the number of input channels. For example, if the number of output channels is smaller than the number of input channels, the input channels may be down-mixed according to the number of the output channels. Alternatively, if the number of output channels is greater than the number of input channels, the input channels may be up-mixed according to the number of the output channels. The processor 140 may include a mixer for performing a mixing job, or may control a mixer that is separately provided.

The auxiliary speaker 120 may additionally output a filtered version of the front channel 1111 signal that has been filtered by a band pass filter 1113 for providing the reinforcing effect described above in FIG. 11A.

Also, the main speaker 110 may additionally output a filtered version of the surround channel 1112 signal that has been filtered by a low pass filter (LPF) 1114, thereby reinforcing a component of a low frequency band that is difficult to be output by the auxiliary speaker 120.

While embodiments have been shown and described, the disclosure is not limited to the aforementioned specific example embodiments, and it is apparent that various modifications may be made by those having ordinary skill in the technical field to which the disclosure belongs, without departing from the scope of the disclosure as claimed by the appended claims. Also, it is intended that such modifications are not to be interpreted independently from the technical idea or prospect of the disclosure.

What is claimed is:

1. A display apparatus comprising:
    a display panel configured to display an image in a front direction;
    a main speaker provided on a rear surface of the display panel;
    an auxiliary speaker provided on the rear surface of the display panel, the auxiliary speaker being configured to output a sound in a rear direction opposing the front direction; and
    a processor configured to:
        identify an amount of channels in an input audio signal;
        filter the input audio signal based on the amount of channels in the input audio signal;
        based on the audio signal having two channels, control the main speaker to output the audio signal and control the auxiliary speaker to output a filtered version of the audio signal; and
        based on the audio signal having three or more channels, control the main speaker to output a front channel of the audio signal and a first filtered version of a surround channel of the audio signal, and control the auxiliary speaker to output a filtered version of the front channel of the audio signal and a second filtered version of the surround channel.

2. The display apparatus of claim 1, wherein the auxiliary speaker is configured to output the sound in a direction that is inclined by a predetermined angle with respect to the rear surface of the display panel.

3. The display apparatus of claim 1, wherein the auxiliary speaker comprises:
    an upper speaker provided on an upper portion of the rear surface of the display panel; and
    a side speaker provided on a side portion of the rear surface of the display panel.

4. The display apparatus of claim 1, wherein the auxiliary speaker is provided on a corner of an upper portion of the rear surface of the display panel.

5. The display apparatus of claim 1, further comprising a backside cover covering the auxiliary speaker.

6. The display apparatus of claim 5, wherein the backside cover comprises an air vent or slit in an area corresponding to a sound outputting area of the auxiliary speaker.

7. The display apparatus of claim 1, wherein the main speaker comprises:
    a first main speaker provided on a side portion of the rear surface of the display panel, the first main speaker being configured to output a sound in a side direction; and
    a second main speaker provided on a lower portion of the rear surface of the display panel, the second main speaker being configured to output a sound in a lower direction.

8. The display apparatus of claim 7, wherein the first main speaker comprises at least one of a tweeter or a mid-range speaker, and the second main speaker comprises a woofer.

9. The display apparatus of claim 1, wherein the processor is configured to, based on a two-channel audio signal being input, control the main speaker to output the input two-channel audio signal, and control the auxiliary speaker to output the input two-channel audio signal on which signal processing has been performed.

10. The display apparatus of claim 9, wherein the signal processing performed on the input two-channel audio signal comprises bandwidth reinforcing processing within a predetermined frequency range.

11. A sound outputting method of a display apparatus comprising a display panel having a front surface facing a front direction and a rear surface facing a rear direction opposite to the front direction, a main speaker provided on the rear surface of the display panel, and an auxiliary speaker provided on the rear surface of the display panel, the method comprising:
    receiving an input audio signal;
    identifying an amount of channels in the input audio signal;
    filtering the audio signal based on the amount of channels in the input audio signal;
    based on the audio signal having two channels, outputting the audio signal through the main speaker provided on the rear surface of the display panel and outputting a filtered version of the audio signal through the auxiliary speaker provided on the rear surface of the display panel; and
    based on the audio signal having three or more channels, outputting a front channel of the audio signal and a first filtered version of a surround channel of the audio signal through the main speaker provided on the rear surface of the display panel, and outputting a filtered version of the front channel of the audio signal and a second filtered version of the surround channel through the auxiliary speaker provided on the rear surface of the display panel.

12. The sound outputting method of claim 11, wherein the outputting the filtered version of the audio signal through the auxiliary speaker comprises, based on the audio signal having the two channels, outputting the audio signal having the two channels on which signal processing has been performed by the auxiliary speaker.

13. The sound outputting method of claim 12, wherein the signal processing performed on the audio signal having the two channels comprises bandwidth reinforcing processing within a predetermined frequency range.

14. A sound outputting method of a display apparatus comprising a display panel having a front surface facing a front direction and a rear surface facing a rear direction opposite to the front direction, a main speaker provided on the rear surface of the display panel, and an auxiliary speaker provided on the rear surface of the display panel, the method comprising:
- receiving an input audio signal;
- identifying an amount of channels in the input audio signal;
- filtering the input audio signal, based on the amount of channels in the input audio signal;
- based on the audio signal having two channels, outputting the audio signal through the main speaker provided on the rear surface of the display panel and outputting a filtered version of the audio signal through the auxiliary speaker provided on the rear surface of the display panel;
- based on the audio signal having three or more channels, outputting a front channel of the audio signal and a first filtered version of a surround channel of the audio signal through the main speaker provided on the rear surface of the display panel, and outputting a filtered version of the front channel of the audio signal and a second filtered version of the surround channel through the auxiliary speaker provided on the rear surface of the display panel; and
- setting, based on a type of the audio signal being a signal having two or less channels, a front channel of the audio signal.

15. The sound outputting method of claim 14, further comprising:
- compiling, based on the type of the input audio signal having three or more channels, the front channel of the input audio signal having three or more channels and a low pass filtered version of the surround channel; and
- compiling, based on the type of the input audio signal having three or more channels, a high pass filtered version of the surround channel and a band pass filtered version of the front channel of the input audio signal having three or more channels.

* * * * *